United States Patent
Jauregui et al.

(10) Patent No.: US 6,456,713 B1
(45) Date of Patent: Sep. 24, 2002

(54) METHOD AND APPARATUS FOR DETECTING DATA PORT USAGE

(75) Inventors: Mario E. Jauregui, San Bruno; Elaine C. He, San Jose; Ronald S. Lesniak, Santa Cruz; Spencer L. Hermanson; Maxim Bakaleynik, both of San Jose, all of CA (US)

(73) Assignee: Teledex LLC, San Jose, CA (US)

( * ) Notice: Subject to any disclaimer, the term of this patent is extended or adjusted under 35 U.S.C. 154(b) by 0 days.

(21) Appl. No.: 09/109,609

(22) Filed: Jul. 2, 1998

(51) Int. Cl.[7] ................................................ H04M 1/00

(52) U.S. Cl. ............................... 379/399.01; 379/93.09

(58) Field of Search ................................. 379/156, 166, 379/377, 384, 399, 93.09, 93.37

(56) References Cited

U.S. PATENT DOCUMENTS

| | | | | |
|---|---|---|---|---|
| 4,953,200 A | * | 8/1990 | Yamasaki | 379/156 |
| 5,309,508 A | | 5/1994 | Rosen | |
| 5,473,676 A | * | 12/1995 | Frick et al. | 379/93.09 |
| 5,625,679 A | * | 4/1997 | Gutzmer | 379/93.37 |

FOREIGN PATENT DOCUMENTS

EP     0 647 054 A     4/1995

* cited by examiner

Primary Examiner—F. W. Isen
Assistant Examiner—Jefferey F. Harold
(74) Attorney, Agent, or Firm—Thelen Reid & Priest LLP; Robert E. Krebs

(57) ABSTRACT

A circuit for notifying a PBX that a data port in a telephone connected to the PBX is about to be used. The circuit comprises a current sensor for generating a signal that indicates a modem is drawing current through the data port. A large resistor limits the current being drawn through the data port to a level that does not indicate an off-hook condition to either the PBX or the modem. In response to the signal generated by the current sensor, a separate telephone circuit provides an off-hook condition that draws a first dial tone from the PBX. A microprocessor in the circuit generates a signal that causes a dialer in the telephone circuit to dial a number that notifies the PBX that the modem is attempting to access the PBX through the data port. After the PBX is notified of the imminent data port usage, it presents a second dial tone on line two which is the dial tone for an outside line. The microprocessor then activates a thyristor which electrically bypasses the resistor and allows sufficient current to be drawn by the modem to maintain the off-hook condition.

16 Claims, 3 Drawing Sheets

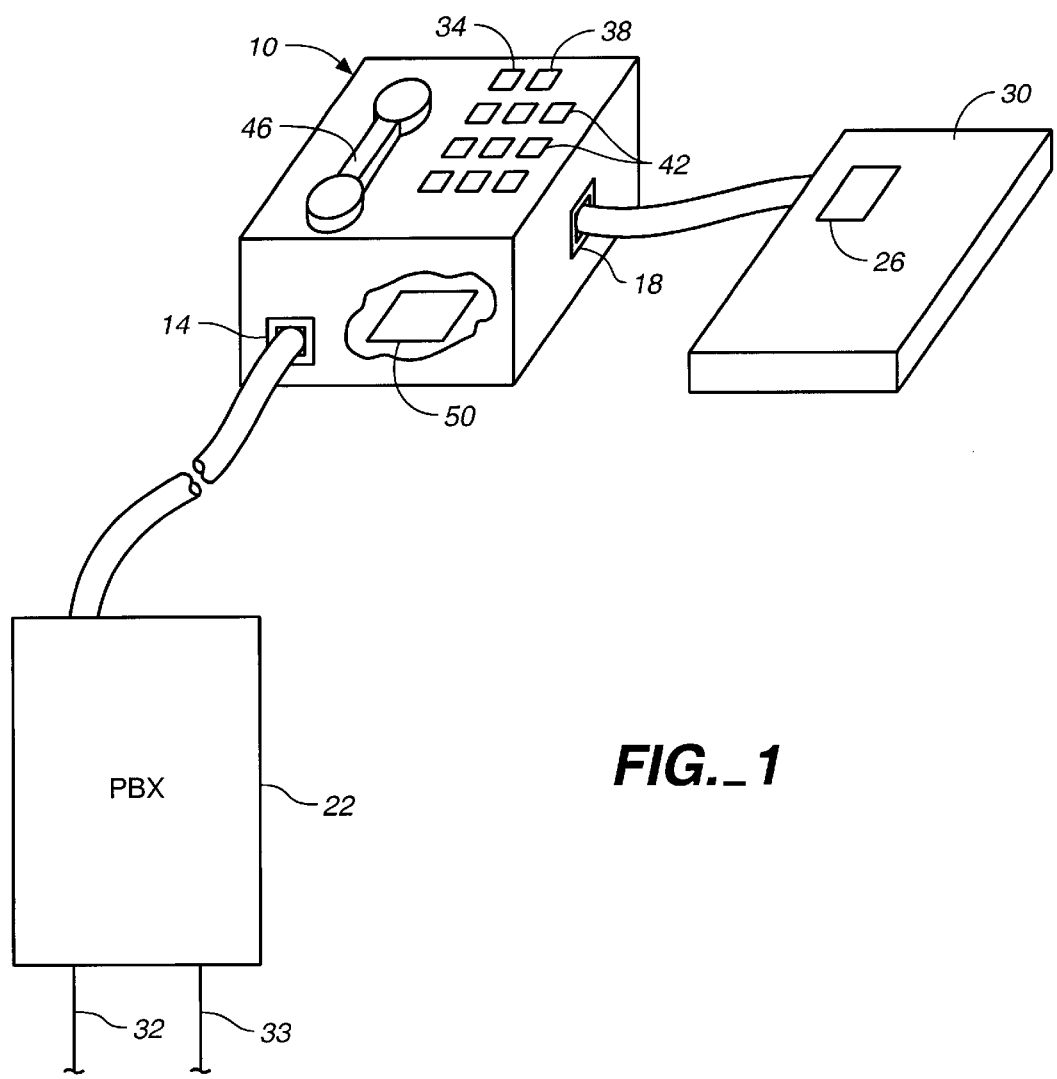
FIG._1

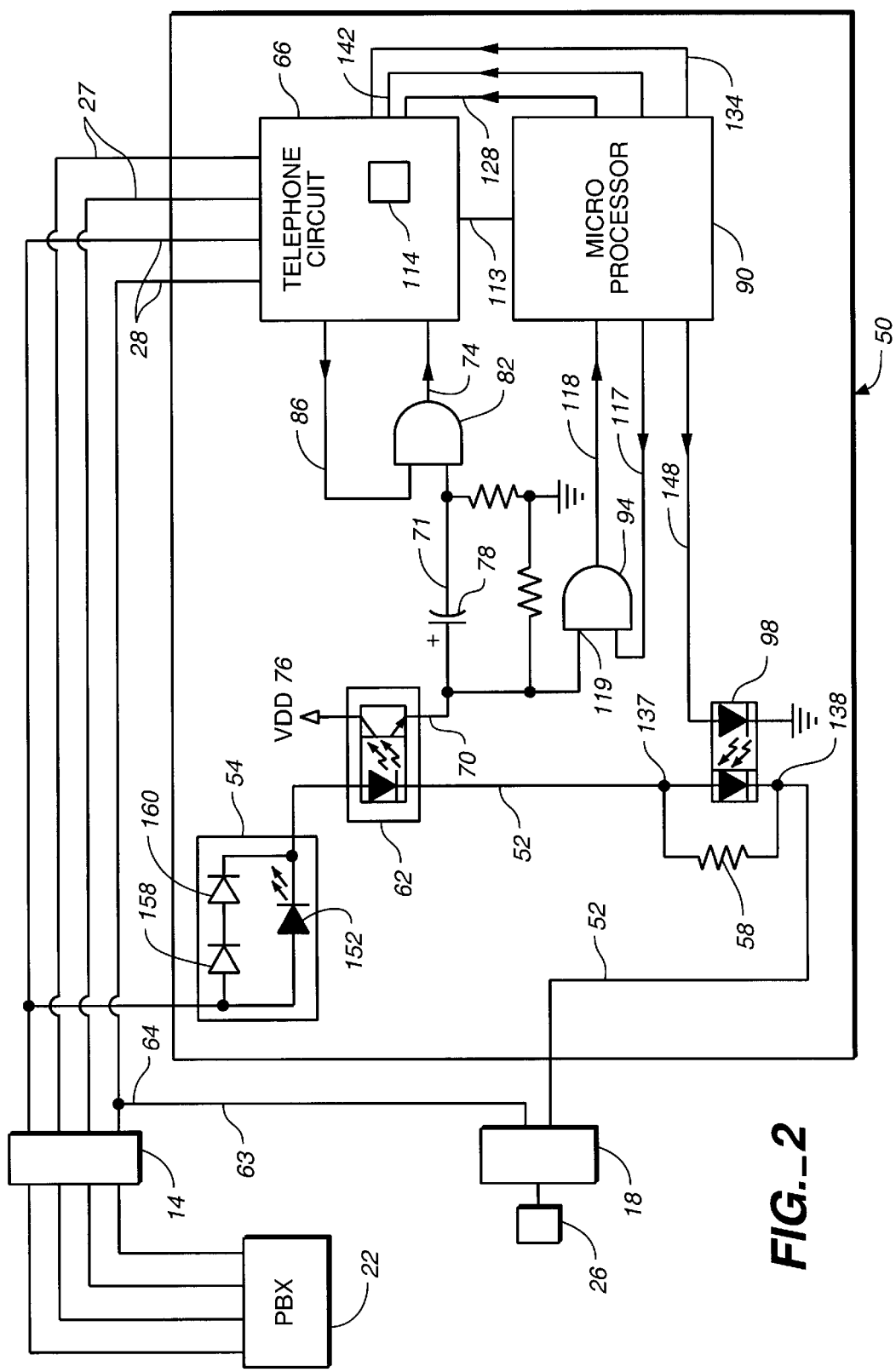
FIG._2

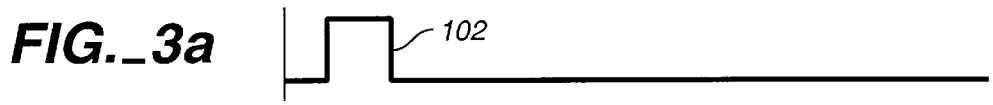
FIG._3a
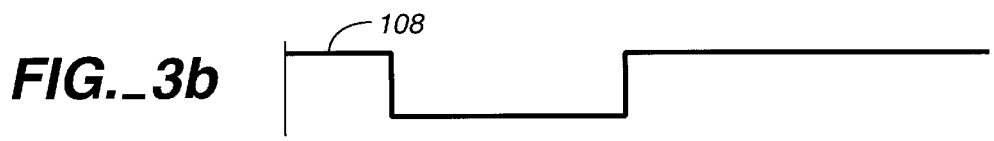
FIG._3b
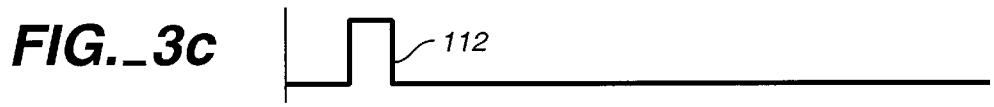
FIG._3c
FIG._3d
FIG._3e
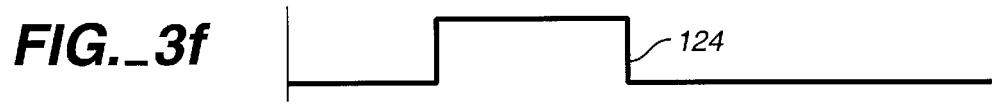
FIG._3f
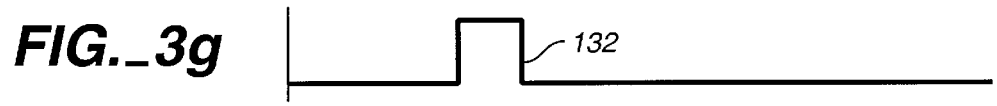
FIG._3g
FIG._3h
FIG._3i
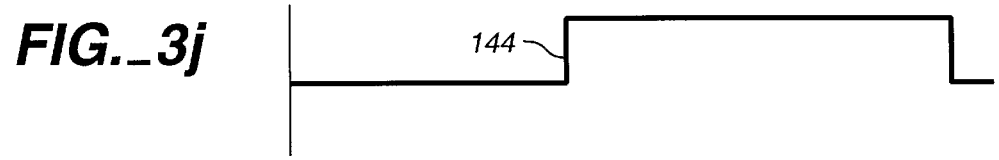
FIG._3j

METHOD AND APPARATUS FOR DETECTING DATA PORT USAGE

BACKGROUND OF THE INVENTION

1. Technical Field

The present invention relates to telephone jacks (data ports) for allowing a computer to be connected to a telephone line, and more particularly to an apparatus that automatically notifies a PBX system that usage of a data port is about to occur.

2. Background Information

Telephone sets having a separate data port that allows a computer to be connected to a telephone line are well-known in the art. For example, Teledex Corporation has been marketing phones of this type to the hospitality industry for over nine years. Typically, these phones are used in a private branch exchange (PBX) system found in a hotel or motel.

The data port allows a guest to connect a modem in a computer to the telephone system through the PBX. The guest generally uses the local telephone number of an Internet service provider (ISP) to gain access to the Internet. The guest can then use the computer to read and send e-mail, browse the World Wide Web or conduct numerous other activities associated with the Internet.

It is common for the operator of the PBX system to charge the phone user for making telephone calls over the PBX system. There is normally one rate for long distance calls and another rate for local calls. Frequently, the local charge is a fixed rate, such as fifty cents per local call. A problem that arises with data port usage is that a guest may spend several hours connected to the Internet. This means that one telephone line connected to the PBX system is tied up for a long period of time, and is not available for other users. In such situations, the operator of the PBX system would like to bill the data port user for more than a standard local call as compensation for the length of time the line is tied up. With currently available telephones. this is not possible because there is no way for the PBX system to distinguish a data port call from a regular local call.

BRIEF SUMMARY OF THE INVENTION

Briefly, the present invention comprises a circuit in a telephone that notifies a PBX system that a data port in the telephone is about to be used. The data port is a jack. such as an RJ11 jack, that allows a peripheral device, such as a modem, to be connected to a telephone line. The circuit comprises a sensor means for generating a signal that indicates that the peripheral device is drawing current through the data port. A load means is present in the circuit for limiting the current being drawn through the data port to a level that does not indicate an off-hook condition to either the modem or the PBX. An alert means is present in the circuit for generating a signal that notifies the PBX that the peripheral device is attempting to access the PBX through the data port. The alert means initially generates a first off-hook condition which causes the PBX to provide a first dial tone to the line. The dial tone on the line allows the alert means to use the line to notify the PBX of the of the impending data port usage. When the alert means notifies the PBX that the data port is about to be used, the PBX can take steps to treat the data port call differently than other local telephone calls. A dial tone to an outside line is then presented to the circuit.

After the alert means has notified the PBX that a data port call is about to be made. a microprocessor in the circuit activates a switch means. The switch means electrically bypasses the load means to allow sufficient current to be drawn by the data port to maintain the off-hook condition to the PBX, thereby allowing the modem to use the dial tone to the outside line. The alert means is then removed from the line so that it does not interfere with the peripheral device. Generally, the circuit also includes an indicator means for visually indicating that the data port is in use.

BRIEF DESCRIPTION OF THE SEVERAL VIEWS OF THE DRAWINGS

FIG. 1 is a schematic diagram of a telephone set according to the present invention;

FIG. 2 is a diagram of a circuit for detecting data port usage according to the present invention: and FIG. 3(*a*) through FIG. 3(*j*) represent a timing diagram that illustrates a sequence of events that occur in the present invention.

DETAILED DESCRIPTION OF THE INVENTION

FIG. 1 illustrates a telephone set 10 having a first jack 14 and a second jack 18. The first jack 14 is used to connect the telephone set 10 to conventional telephone lines through a private branch exchange (PBX) telephone system 22. The second jack 18, also referred to as data port 18. is used to connect a modem 26 within a computer 30 to a telephone line through the PBX 22. The data port 18 is preferably positioned in the case of the telephone set 10 so that it is accessible to a user of the telephone set 10. This allows the user to use the data port without having to find the wall plug.

The PBX 22 is connected to a plurality of outside telephone lines (called trunk lines) that are provided by a telephone company, and that allow local and long distance telephone calls to be made. Generally, a first type of trunk line 32 is connected to the PBX for making normal voice calls. The telephone company may also provide a second type of trunk line 33, such as a high speed line for the transmittal of digital data from a computer. The data port 18 can also be used to connect other peripheral devices that utilize a telephone line, such as a fax machine, to the telephone system.

In the preferred embodiment the telephone set 10 is a two line phone so that the first jack 14 provides access to two independent telephone lines in the PBX 22. These lines are referred to as line one and line two. In FIG. 2, a pair of leads 27 represent the electrical connections for line one within the telephone set 10, and a pair of leads 28 represent the electrical connections for line two within the telephone set 10. In other embodiments, the telephone 10 could be a one line phone. In the preferred embodiment, the jacks 14 and 18 are conventional RJ11 telephone jacks that are positioned in the outer case of telephone set 10 and are electrically connected to circuitry inside of telephone set 10.

The telephone set 10 is a conventional telephone set and is capable of providing normal voice telephone service over each of the two lines, as is well-known in the art. Generally, the telephone set 10 includes a pushbutton 34 for selecting line one and a pushbutton 38 for selecting line two when making voice calls. A plurality of pushbuttons 42 are provided on the telephone set 10 for dialing telephone numbers. A handset 46 is provided for use in making telephone calls. Typically, the telephone set 10 also includes a handsfree microphone and speaker (not shown) so that telephone calls can be made without using the handset 46, as is well-known in the art.

In the present invention, the telephone set 10 also includes a circuit 50 that notifies the PBX 22 when the data port 18 is about to be used. In the preferred embodiment, line two is also used by the modem 26, for example to connect the computer 30 to the Internet, or to establish some other type of phone connection between the computer 30 and another computer.

FIG. 2 is a circuit diagram that illustrates how the circuit 50 functions. When the modem 26 is plugged into the data port 18, there is no current flowing in a loop 52. Generally, the modem 26 is like an open switch, so that current cannot flow in the loop 52. When the software associated with the modem is instructed to "connect" to a telephone line, the electronic circuitry in the modem 26 is reconfigured so that current can flow through the modem 26, and hence in the loop 52. This condition is called a request-for-line condition or an off-hook condition.

Only after the modem 26 is placed in a request-for-line condition, is current drawn through the data port 18 and flows in the loop 52. However, initially the amount of current flowing in the loop 52, and across an indicator means 54 and sensor means 62 which are part of the loop 52, is very small. This is because the switch means 98 is open and a large resistor 58 (about one hundred thousand ohms) is in series with the indicator means 54 and the current sensor means 62 in the loop 52, thereby limiting the current in the loop 52 to about 0.5 milliamps. This amount of current is so small that the PBX 22 does not recognize it as an off-hook condition, and therefore does not give a dial tone to line two in response to the request-for-line condition. Thus, the resistor 58 acts as a load means that provides a small current path for the sensor means 62. A lead 63 connects the data port to one of the leads 28 that comprise line two and a lead 64 connects the indicator means 54 to the other lead 28 that comprises line two. The leads 63 and 64 are part of the loop 52. The current drawn through the data port 18 comes from the PBX 22.

A current sensor 62 senses the small current flow in the loop 52 and sends a signal to a telephone circuit 66, over a lead 74, that the data port 18 is about to be used. In other words, the signal indicates that a peripheral device, such as the modem 26, is drawing current through the data port 18 and therefore it is assumed that the data port is about to be used. The sensor 62 is an opto-electrical sensor. When current flows through an LED in the sensor 62, it emits light which activates a transistor in the sensor 62. The transistor connects a power source 76 to a lead 70, thereby generating the signal that current is being drawn through the data port 18. The power for power source 76 comes from stored and regulated line power.

A capacitor 78 ensures that only an initial positive component (pulse) of the signal reaches an AND gate 82 through a lead 71. The AND gate 82 is connected between the lead 71 and the telephone circuit 66 by the lead 74. The AND gate 82 passes a signal to the telephone circuit 66 that the data port 18 is about to be used. If the circuit 66 is busy prior to the request for line from the data port 18 (i.e. line one or line two is already in use on the telephone), the lead 86 prevents the AND gate 82 from passing that signal to the telephone circuit 66. As is explained later, this condition prevents interruption in service from the data port 18. The circuit 50 also includes a microprocessor 90, an AND gate 94 and a switch means 98.

When the telephone circuit 66 receives the signal from the AND gate 82 that the data port 18 is about to be used (and when the telephone circuit 66 is not busy), a series of events occur. FIG. 3 is a timing diagram that illustrates this sequence of events. In FIG. 3(*a*), a signal 102 represents the signal that is sent to the telephone circuit 66 from the current sensor 62 (and the AND gate 82) to indicate that the data port 18 is about to be used. In FIG. 3(*b*), a signal 108 indicates whether or not tile telephone set 10 is busy (on-hook and off-hook status), with the high part of signal 108 indicating that the telephone set 10 is not busy and the low part indicating that the telephone set 10 is busy.

In FIG. 3(*c*), a signal 112 indicates that immediately after the signal 102 is received by the telephone circuit 66, the circuit 66 selects line two and presents an off-hook condition to the PBX 22 so that a dial tone (a first dial tone) on line two is presented to the telephone circuit 66. This is the off-hook state shown by the low signal in FIG. 3(*b*). When line two is selected, power from line two is provided to the microprocessor 90 through the circuit 66 over a lead 113 (the microprocessor 90 is off when not in use). When the microprocessor 90 is powered up from line two through the circuit 66, microprocessor 90 sends a signal 116 over a lead 117 to the AND gate 94, which indicates that the microprocessor 90 is powered up. A lead 118 connects the AND gate 94 to the microprocessor 90. With the current sensor 62 generating a high signal (signal 102) to lead 70, a pin 119 in the AND gate 94 goes high. With the pin 119 high and the signal 116 present, a signal 120, shown in FIG. 3(*e*), is sent from the AND gate 94 to the microprocessor 90 over the lead 118. This arrangement prevents the microprocessor 90 from receiving signals when it is not powered up. The signal 120 tells the microprocessor 90 that the data port 18 is about to be used.

Shortly after the microprocessor 90 receives the signal 120, the microprocessor 90 sends a signal 124, shown in FIG. 3(*f*) to the telephone circuit 66 over a line 128. The signal 124 mutes the speaker in the telephone set 10 so that the dialing that is about to occur cannot be heard. In FIG. 3(*g*), a signal 132 is sent from the microprocessor 90 to the circuit 66 over a lead 134 that causes the microprocessor 90 to instruct a dialer 114 in the telephone circuit 66 to dial one or more numbers. The number or numbers are dialed as a series of dual tone multifrequency (DTMF) tones and are transmitted to the PBX 22 over line two (leads 28). The number that is dialed in response to the signal 132 alerts the PBX 22 that the data port 18 is about to be used and is referred to as the alert signal. For example, a single digit such as the number eight can be used as the alert signal. However, it should be appreciated that the PBX 22 can be programmed to recognize any number or sequence of numbers as the alert signal, so this is only an example. When the PBX 22 receives the alert signal, it processes the alert signal, as will be explained later, and then presents a dial tone for an outside line (a second dial tone) to line two.

In the preferred embodiment, the dialer 114 is a conventional DTMF dialer. In the situation described previously, where the AND gate 82 is receiving a signal indicating that the telephone set 10 is busy, the alert sequence will not be initiated. This means that the signals 112, 124 and 132 will not be generated because this would cause an interruption in service. Hence, in this situation, the PBX 22 is not alerted that the data port 18 is about to be used.

In FIG. 3(*h*), a signal 136 indicates that an instruction is sent from the microprocessor 90 to the switch means 98 that causes the switch means 98 to electrically connect a pair of nodes 137 and 138 in the loop 52. When this connection is made, the resistor 58 is bypassed, thereby allowing adequate current to flow in the loop 52, and through the modem 26, to maintain the off-hook condition to the PBX 22. The modem 26 then receives the second dial tone from the PBX 22. over line two, as is well-known in the art. As discussed previously, the second dial tone is the dial tone for an outside line. Additionally, with adequate current flowing in the loop 52, the indicator means 54 indicates that the data port 18 is in use.

In the preferred embodiment the switch means 98 comprises a two input thyristor chip. When the modem 26 is turned off. the resulting current drop will cause the switch means 98 to reopen. thereby reloading the resistor 58 in the loop 52. This will cause the indicator means 54 to cease emitting light or otherwise indicating that the data port 18 is in use.

In FIG. 3(i). a signal 140 indicates that after the switch means 98 is activated, an instruction is sent from the microprocessor 90 to the telephone circuit over a line 142, to deselect line two from the telephone circuit 66. This is done so that the telephone circuit 66 will not interfere with the modem 26. In FIG. 3(j), a signal 144 indicates that the modem 66 is being used. Preferably, the entire sequence of events depicted in FIG. 3(a–j) happen so quickly that a person using the modem 26 does not realize that anything is happening between the time the modem 26 makes a request for line and the time the modem 26 is connected to the outside line. Typically, this means that the sequence of events depicted in FIG. 3(a–j) occurs in approximately 1–3 seconds.

In the preferred embodiment, the indicator means 54 comprises a light emitting diode (LED) 152 that emits light when current is flowing in the loop 52. Thus, the indicator means provides a visible indication that the data port 18 is being used.

When the modem 26 is turned off, the current flow in the loop 52 ceases, thereby causing the LED 152 to cease emitting light. A pair of diodes 158 and 160 protect the LED 152 from damaging levels of current flow. The indicator means 54 is an optional component that can be deleted from the present invention if desired.

In the preferred embodiment the telephone circuit 66 is a standard telephone circuit that includes line-select logic, a dialer and speech network. The dialer 114 is commercially available from sources such as Samsung, part number KS58015D and the speech network is available from Motorola, part number MC33215. The microprocessor 90 is a commercially available microprocessor such as part number KS57P2616Q, available from Samsung. The current sensor 62 is a commercially available opto-isolator such as part number TLP372, available from Toshiba. The thyristor 98 is a commercially available component such as part number H11C4, available from Siemens. The LED 152 is a commercially available LED such as part number LTL 4268UR, available from LITEON.

Referring to FIGS. 1–3, the purpose of the present invention can be discussed. The signal 132 (shown in FIG. 3) indicates that a sequence of numbers is dialed to notify the PBX 22 that the data port 18 is about to be used. This notification gives the PBX 22 the opportunity to make one or more policy decisions. For example, if normal voice calls are billed at a first rate, the PBX 22 may bill the data port call at a second rate that is different from the first rate. For example, local calls are usually billed at a flat fee by hotels and motels, for example $0.50 per call. In the case of a data port call, the PBX 22 may bill the data port call at a different (usually higher) rate. for example $1.00 per minute. The justification for the second rate could be to compensate for the longer time data port calls tend to keep an external line tied up relative to voice calls.

In other situations the PBX 22 may have the capability of offering data port users a connection to a high-speed external line, such as a T–1 line (e.g. trunk line 33). When the PBX 22 is notified of the imminent data port call, line two could be connected to the high-speed line. The PBX operator may choose to bill for this service at the second (usually higher) rate discussed above.

In general, the present invention can be thought of as operating in the following manner: 1) The sensor means 62 detects a first amount of current being drawn by the modem 26 through the data port 18; 2) The sensor means 62 sends a signal to the telephone circuit 66 that the data port 18 is about to be used; 3) The circuit 66 selects line two and provides an off-hook condition so that a first dial tone on line two is presented to the circuit 66; 4) The microprocessor 90 is powered up from line two; 5) The speaker in the telephone set 10 is muted; 6) The dialer 114 sends an alert signal to the PBX 22 that the data port is about to be used; 7) The alert signal is processed by the PBX 22 according to a predetermined policy programmed into the PBX 22. According to the predetermined policy, the PBX 22 may implement a special procedure with respect to usage of line two by the data port 18, such as billing the time that line two is used by the data port at a higher rate than non-data port usage and/or making a special trunk line available to line two, such as a high speed data line; 8) After processing the alert signal, the PBX 22 presents a second dial tone on line two. The second dial tone is for an outside line and may be the high speed data line if that is what the predetermined policy calls for; 9) The microprocessor 90 causes a connection to be made through the switch means 98 that allows a second amount of current to flow to the modem 26 through the data port 18, the second amount of current being sufficient to maintain the off-hook condition to the PBX 22: 10) The indicator means 54 indicates that the data port 18 is in use; and 11) Line two is deselected, thereby removing the circuit 66 from line two so that it does not interfere with the operation of modem 26.

Although the present invention has been described in terms of the presently preferred embodiment, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

We claim:

1. A circuit for detecting data port usage comprising:

an opto-isolator for generating a signal that indicates a modem is drawing current through a data port;

load means that limit the current being drawn through the data port to a level that does not indicate an off-hook condition to a PBX;

alert means for generating an alert signal that notifies the PBX that the modem is attempting to access the PBX through the data port; and a thyristor for electrically bypassing the load means so that sufficient current is drawn through the data port to maintain an off-hook condition, the thyristor being activated by a signal generated after the alert means has generated the alert signal.

2. The circuit of claim 1 further comprising:

indicator means for visually indicating that the data port is in use.

3. The circuit of claim 1 wherein the data port comprises an RJ11 jack.

4. A telephone system comprising:

a key telephone including an opto-electrical circuit electrically coupled with a data port to provide a modem to be electrically coupled with a PBX, said opto-electrical circuit to detect when said modem is attempting to access said PBX through the data port, and a processing unit to notify the PBX that the modem is attempting to access the PBX through the data port, wherein upon being notified, said PBX makes a policy decision corresponding to a billing rate; and first jack means positioned in the telephone set for electrically connecting the telephone set to a PBX.

5. The telephone system of claim 4, wherein said key telephone further comprising:

indicator means positioned on the key telephone for visually indicating that the data port is in use.

6. The telephone system of claim 4, wherein the data port comprises an RJ11 jack.

7. The telephone system of claim 4, wherein the modem connects a telephone line via selectively a computer and a facsimile machine.

8. The telephone system of claim 4, wherein the opto-electrical circuit comprises a current sensor.

9. The telephone system of claim 4, wherein the processing unit notifies the PBX via a DTMF dialer.

10. The telephone system of claim 5, wherein the indication means comprises an LED.

11. The telephone system of claim 4, further comprising:

load means for providing a small current path for the opto-electrical circuit; and switch means for providing an electrical pathway that circumvents the load means when the modem is operating, the switch means being activated in response to an activation signal generated by the processing unit.

12. The telephone system of claim 11, wherein the processing unit comprises a microprocessor.

13. A method for detecting data port usage comprising:

detecting a request-for-line condition in a modem connected to a data port associated with a telephone set;

transmitting an alert signal to a PBX that the request-for-line condition has been detected in the device connected to the data port; and after the PBX receives the alert signal, connecting the device to a first trunk group of telephone lines having a different billing rate than a second trunk group of telephone lines.

14. A method for detecting data port usage in a telephone comprising:

detecting a first amount of current being drawn by a modem through a data port positioned in a telephone set, the first amount of current indicating that the modem is requesting a dial tone but being insufficient to cause a dial tone to be presented to the modem;

sending a signal to a telephone circuit in the telephone set that the data port is about to be used;

sending an alert signal from the telephone circuit to a PBX that the data port is about to be used;

after the alert signal has been sent to the PBX, causing a second amount of current to flow to the modem through the data port, the second amount of current being sufficient to maintain an off-hook condition to the PBX; and in response to the alert signal, assigning a special rate to usage on the telephone line associated with the data port.

15. An electrical circuit for distinguishing a data port call from a regular telephone call in a telecommunications environment, comprising:

an opto-electrical device electrically coupled with the data port to provide a modem to be electrically coupled with a PBX , said opto-electrical circuit to detect when said modem is attempting to access said PBX through the data port;

a processing unit to notify the PBX that the modem is attempting to access the PBX through the data port, wherein upon being notified, said PBX makes a policy decision;

load means for providing a small current path for the opto-electrical device; and switch means for providing an electrical pathway that circumvents the load means when the modem is operating, the switch means being activated in response to an activation signal generated by the processing unit.

16. The electrical circuit as set forth in claim 15, wherein the policy decision includes selectively one of the following: a special rate usage corresponding to the data port and a high-speed external line connection.

* * * * *